(12) United States Patent
Kim

(10) Patent No.: US 6,671,520 B1
(45) Date of Patent: Dec. 30, 2003

(54) REMOTELY OPERATED PORTABLE WIRELESS VIDEO/AUDIO MONITORING SYSTEM

(75) Inventor: Hyung-Tae Kim, Incheon (KR)

(73) Assignee: Wooju Communications Co., Ltd., Incheon (KR)

( * ) Notice: Subject to any disclaimer, the term of this patent is extended or adjusted under 35 U.S.C. 154(b) by 0 days.

(21) Appl. No.: 09/497,979

(22) Filed: Feb. 4, 2000

(30) Foreign Application Priority Data

Feb. 5, 1999 (KR) .......................................... 1999-3896

(51) Int. Cl.⁷ ................................................. H04B 1/38
(52) U.S. Cl. ................. 455/556; 348/14.02; 348/211.2; 348/213
(58) Field of Search ................................ 348/143, 152, 348/211.2, 211.11, 211.99, 211.4, 153, 213, 14.01, 14.02; 455/90, 550, 556, 553.1, 556.1, 557

(56) References Cited

U.S. PATENT DOCUMENTS

| | | | | |
|---|---|---|---|---|
| 5,844,601 A | * | 12/1998 | McPheely et al. | 348/143 |
| 5,966,643 A | * | 10/1999 | Radley | 455/74.1 |
| 6,208,379 B1 | * | 3/2001 | Oya et al. | 348/211.11 |
| 6,366,771 B1 | * | 4/2002 | Angle et al. | 455/414.1 |
| 6,377,818 B2 | * | 4/2002 | Irube et al. | 455/556.1 |
| 6,424,371 B1 | * | 7/2002 | Wen | 348/153 |
| 6,522,352 B1 | * | 2/2003 | Strandwitz et al. | 348/211.2 |
| 6,535,239 B1 | * | 3/2003 | Kim | 348/14.02 |
| 6,535,243 B1 | * | 3/2003 | Tullis | 348/207.1 |
| 6,542,191 B1 | * | 4/2003 | Yonezawa | 348/333.01 |
| 6,549,230 B2 | * | 4/2003 | Tosaya | 348/14.08 |
| 6,577,849 B1 | * | 6/2003 | Eaton | 455/31.1 |

* cited by examiner

Primary Examiner—Nay Maung
Assistant Examiner—Tan Trinh
(74) Attorney, Agent, or Firm—Lee, Hong, Degerman, Kang & Schmadeka

(57) ABSTRACT

A remotely operated wireless video/audio hand-held monitoring system comprises a central station having a display and a speaker, and at least one remote terminal having a camera and a microphone. The central station is adapted to send out control command data containing a remote terminal identifier, a communication frequency channel number and any one of a test command, a power on command and a power off command, to receive response data corresponding to the control command data and to reproduce video and audio signals transmitted at a frequency corresponding to the communication frequency channel number, respectively, through the display and speaker in response to the received response data. The remote terminal is adapted to receive the control command data from the central station, to send out the response data corresponding to the received control command data to the central station and to, in a power on mode based on the power on command, drive the camera, the microphone and a video/audio signal transmitter and transmit a video signal from the camera and an audio signal from the microphone to the central station at the frequency corresponding to the communication frequency channel number. Therefore, one portable central station can selectively control one or more remote terminals to monitor images and voices at remote locations.

3 Claims, 11 Drawing Sheets

Overall System Operation Diagram

Central Station

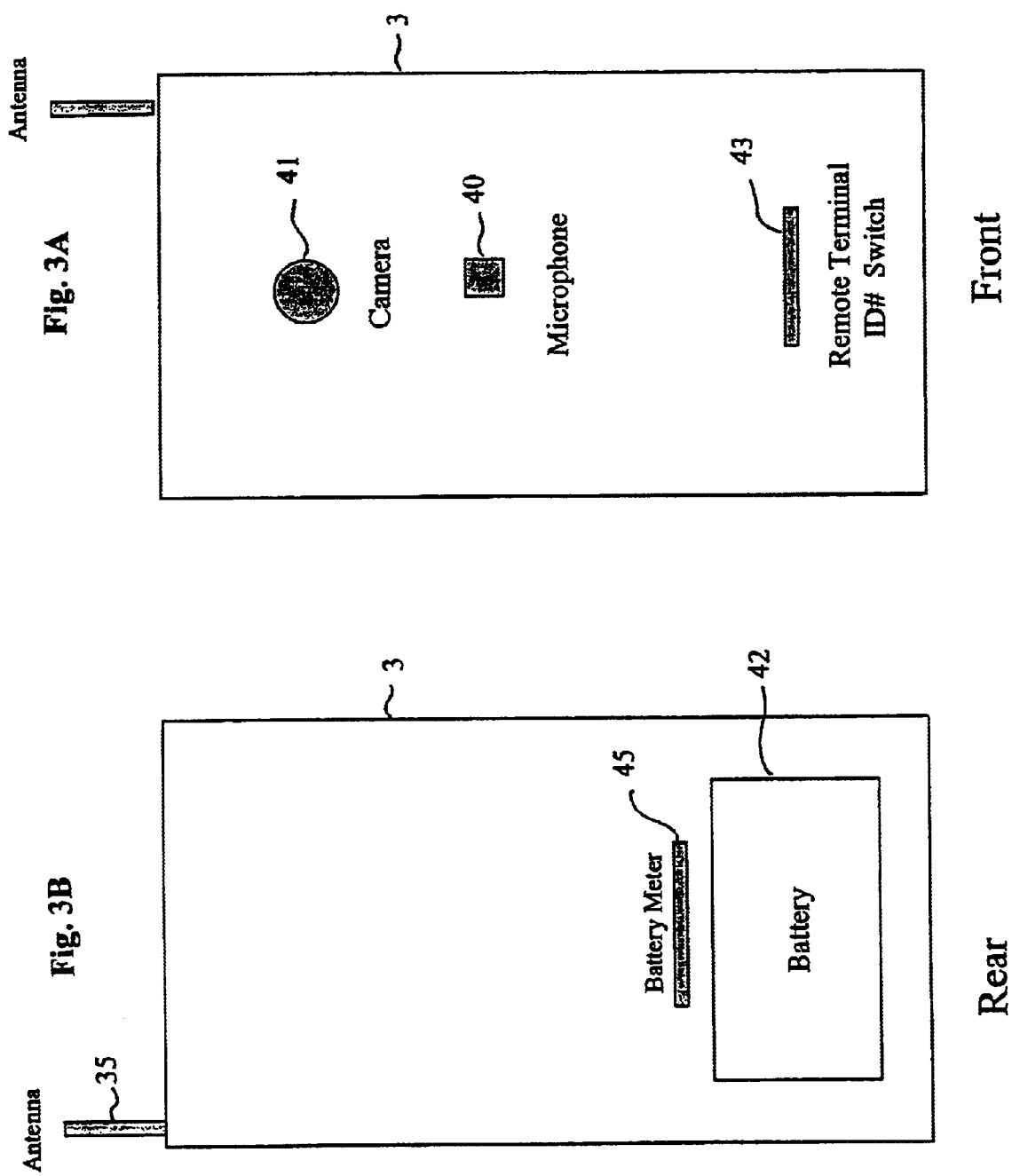

Fig. 6

Operation Code for Command/Response

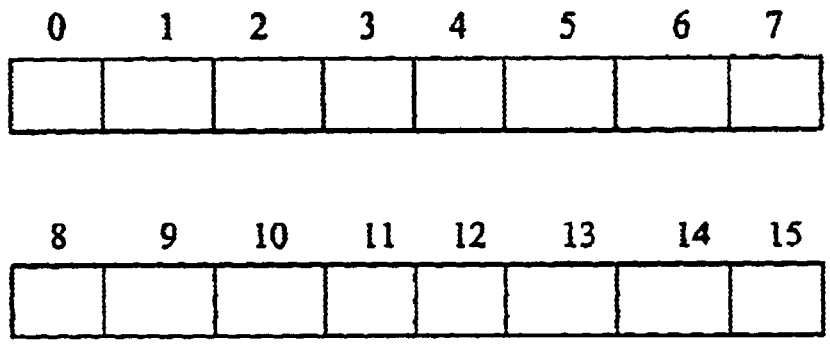

Command: Data sending out from Central Station to Remote Terminal
Response: Data sending out from Remote Terminal to Central Station Two Bytes(Bit 0-15) used for Command
First One Byte(Bit 0-7) used for Response Bit 0:    1  Command
           0  Response Bit 1, 2    0 0  Test
           0 1  Power On
           1 0  Power Off
           1 1  Reserved Bit 3 - 7    Remote Terminal Number Bit 8 - 11    RF Channel Number for Command Bit 12 - 15  Reserved for Command

Subroutine for Received Data Processing

REMOTELY OPERATED PORTABLE WIRELESS VIDEO/AUDIO MONITORING SYSTEM

CROSS REFERENCE TO RELATED ART

This application claims the benefit of Korean Patent Application No. 1999-3896, filed on Feb. 5, 1999, which is hereby incorporated by reference.

BACKGROUND OF THE INVENTION

1. Field of the Invention

The present invention relates in general to a wireless communication system, and more particularly, to a remotely operated portable wireless video/audio monitoring system in which one portable central station selectively controls one or more remote terminals to monitor images and voices at remote locations.

2. Discussion of the Related Art

In conventional communication fields, such as a wireless two-way radio communication system, video transmission and wireless video transmission, there have been provided a variety of devices capable of transmitting and receiving audio and video signals by wireless means or by wire. These video communication devices may be of such a desktop type or cabinet type that they are designed with no restriction in device size and operating power, but they are not suitable for a portable device.

In most monitoring devices, commercially available at the present time, a central station is connected to remote terminals by wire to monitor remote locations. However, such a wire monitoring device is restricted in use because it cannot be adapted for a variety of variations in monitoring circumstances.

SUMMARY OF THE INVENTION

Accordingly, the present invention is directed to a remotely operated wireless portable video/audio monitoring system that substantially obviates one or more of the problems due to limitations and disadvantages of the related art.

An object of the present invention is to provide a remotely operated wireless portable video/audio monitoring system in which one portable central station selectively controls one or more remote terminals to monitor images and voices at remote locations.

It is another object of the present invention to provide a remotely operated communication system in which wireless data communication and analog communication are performed together so that remote terminals can efficiently be controlled and images and voices at remote locations can be monitored.

An object of the present invention is to provide a two-way wireless portable video/audio communication system wherein a portable terminal is used in a hand-held manner and includes a video input camera and a video output display.

The present invention employs techniques used in communication fields, such as a wireless two-way video/audio personal communication system, video transmission, wireless video transmission and remote control device. More particularly, the present invention improves a camera mounted two-way wireless personal video/audio communication system shown in Korean Patent Application No. 1999-634 and its counterpart U.S. patent application Ser. No. 09/481,652, which are incorporated herein by reference, to make it suitable to a remote monitoring system.

In the '634 application, one or more portable terminals constitute a communication group to transmit and receive audio and video signals in a two-way communication system. Hence, images and voices can be transmitted and received among remote terminals in dynamic portable environments. However, one terminal cannot remotely control other terminals, thereby making it impossible for a portable central station to selectively monitor unmanned remote terminals.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a remotely operated wireless video/audio hand-held monitoring system comprises a central station having a display and a speaker, the central station sending out control command data containing a remote terminal identifier, a communication frequency channel number and any one of a test command, a power on command and a power off command, receiving response data corresponding to the control command data and reproducing video and audio signals transmitted at a frequency corresponding to the communication frequency channel number, respectively, through the display and speaker in response to the received response data; and at least one remote terminal having a camera and a microphone, the remote terminal receiving the control command data from the central station, sending out the response data corresponding to the received control command data to the central station and, in a power on mode based on the power on command, driving the camera, the microphone and a video/audio signal transmitter and transmitting a video signal from the camera and an audio signal from the microphone to the central station at the frequency corresponding to the communication frequency channel number.

According to another embodiment of the present invention, a method of transmitting/receiving video and audio signals using a portable wireless communication system comprises the steps of: (a) allowing a central station with a display and a speaker to send out control command data containing a remote terminal identifier, a communication frequency channel number and any one of a test command, a power on command and a power off command, to receive response data corresponding to the control command data and to reproduce video and audio signals transmitted at a frequency corresponding to the communication frequency channel number, respectively, through the display and speaker in response to the received response data; and (b) allowing at least one remote terminal with a camera and a microphone to receive the control command data from the central station, to send out the response data corresponding to the received control command data to the central station and to, in a power on mode based on the power on command, drive the camera, the microphone and a video/audio signal transmitter and transmit a video signal from the camera and an audio signal from the microphone to the central station at the frequency corresponding to the communication frequency channel number.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIGS. 3A and 3B are front and rear views showing a remote terminals in accordance with the present invention;

FIG. 6 illustrates a command/response data format in accordance with the present invention;

DETAILED DESCRIPTION OF THE PREFERRED EMBODIMENTS

With reference to the drawings, and in particular to FIGS. 1A–5C thereof, a wireless communication system embodying the principles and concepts of the present invention will be described.

Figure 1:
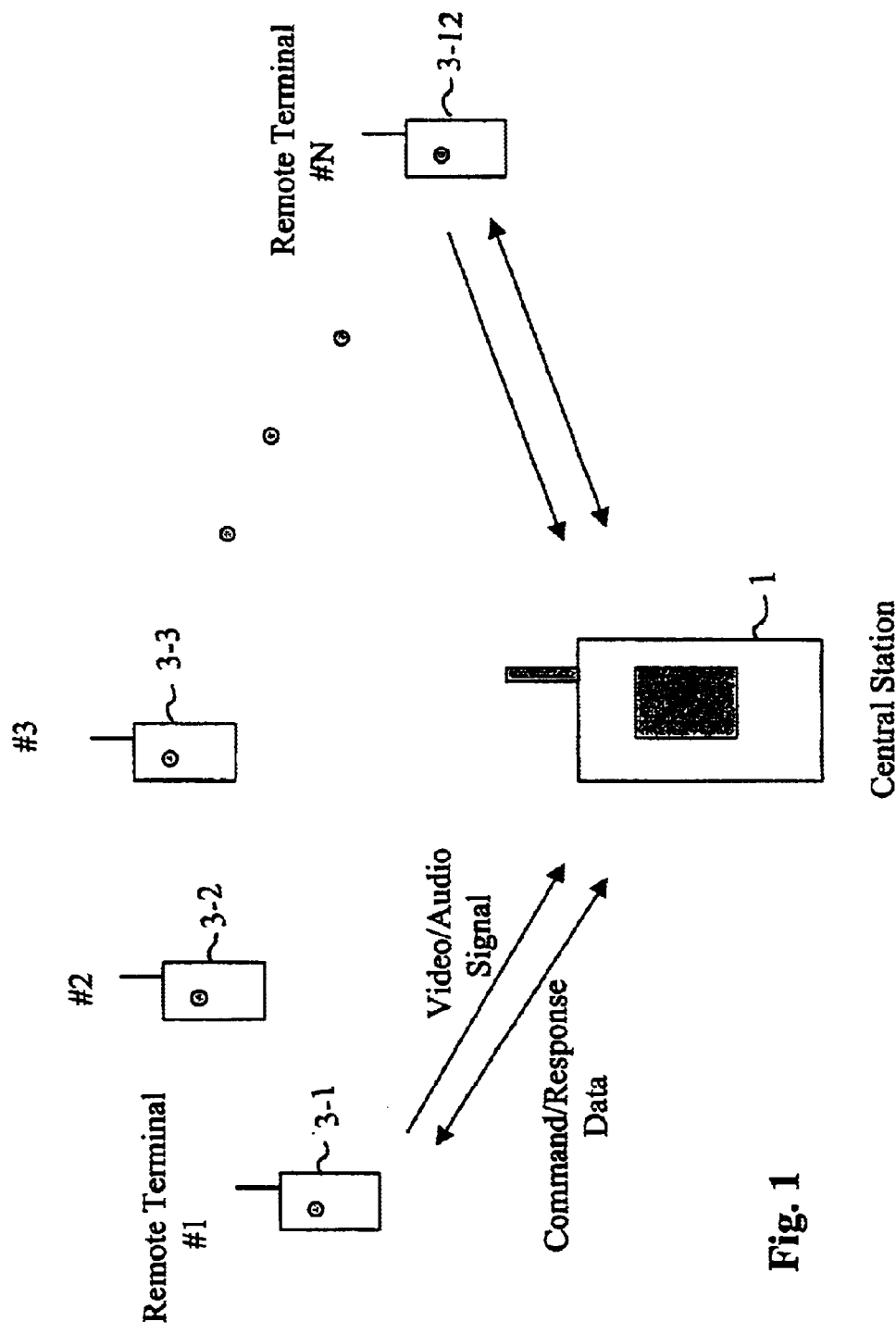
FIG. 1 illustrates a signal/control command flow between a central station and remote terminals in accordance with a preferred embodiment of the present invention.

FIG. 1 illustrates a communication state where a central station 1 and one or more remote terminal 3 transmit and receive command/response data and the central station 1 receives video/audio signals from the remote terminals, in accordance with the preferred embodiment of the present invention. In this drawing, one central station 1 is shown to correspond to a plurality of remote terminals 3-1, 3-2, 3-3, ..., 3-n. The central station 1 is adapted to receive a video signal and audio signal from a selected remote terminal and reproduce such image and voice, respectively, in accordance with the received video and audio signals. The selected remote terminal is adapted to convert an image and voice at a remote location in which it is positioned, respectively into video and audio signals and transmit the converted video and audio signals to the central station 1.

The central station 1 has a display and a speaker, and each of the remote terminals 3 has a camera and a microphone. The central station 1 sends out control command data to the remote terminals 3 to control them and receives response data that the remote terminals 3 send out in response to the control command data. Each of the remote terminals 3 receives control command data sent out from the central station 1 and sends out response data corresponding to the received control command data to the central station 1. In response to the control command data from the central station 1, each remote terminal transmits a video signal and audio signal to the central station 1 or discontinues the transmission.

Figure 2B:
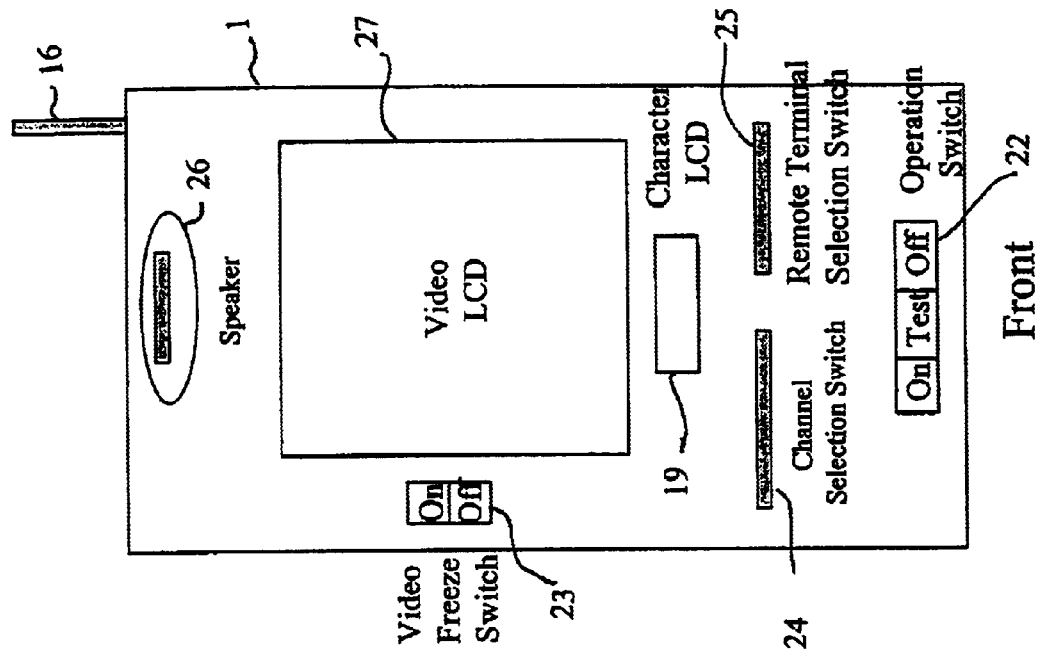
FIGS. 2A and 2B are front and rear views of the central station in accordance with the present invention.
Figure 2A:
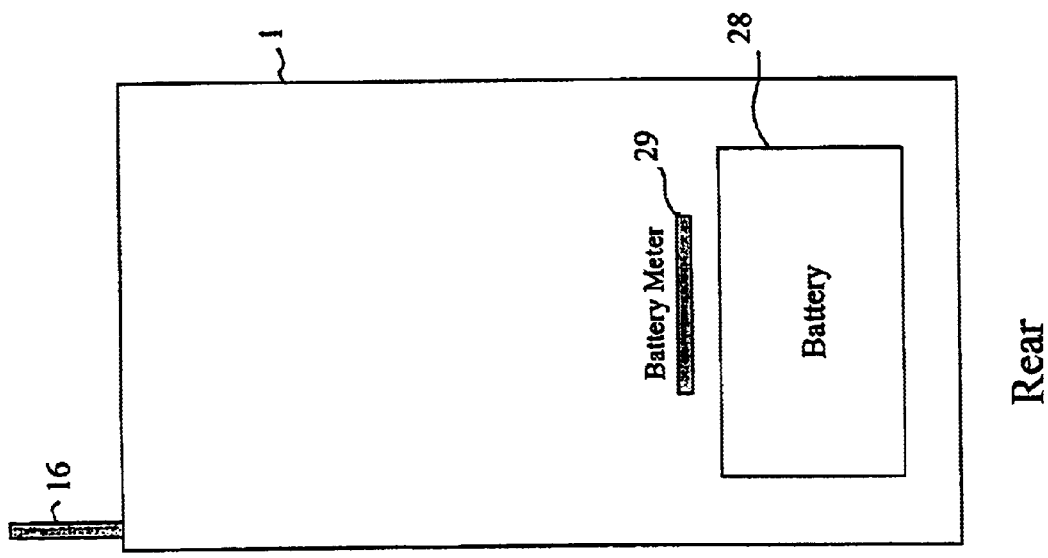

FIGS. 2A and 2B illustrate a first embodiment of a central station 1 according to the present invention. As shown in these drawings, the central station 1 comprises an antenna 16 extending from the housing, preferably on the top of the housing, a speaker 26, video liquid crystal display (LCD) 27, video freeze switch 23, character LCD 19, channel selection switch 24, remote terminal selection switch 25 and operation switch 22 on its front side as shown in FIG. 2A, and a battery 28 and battery meter 29 on its rear side as shown in FIG. 2B.

FIGS. 3A and 3B are front and rear views showing the appearance of each of the remote terminals 3 in accordance with the present invention, respectively. Each remote terminal comprises an antenna 35 on its top, a camera lens 41, a microphone 40 and a remote terminal identifier (ID) switch 43 at its front side as shown in FIG. 3A, and a battery 42 and a battery meter 45 on its rear side as shown in FIG. 3B.

Figure 4:
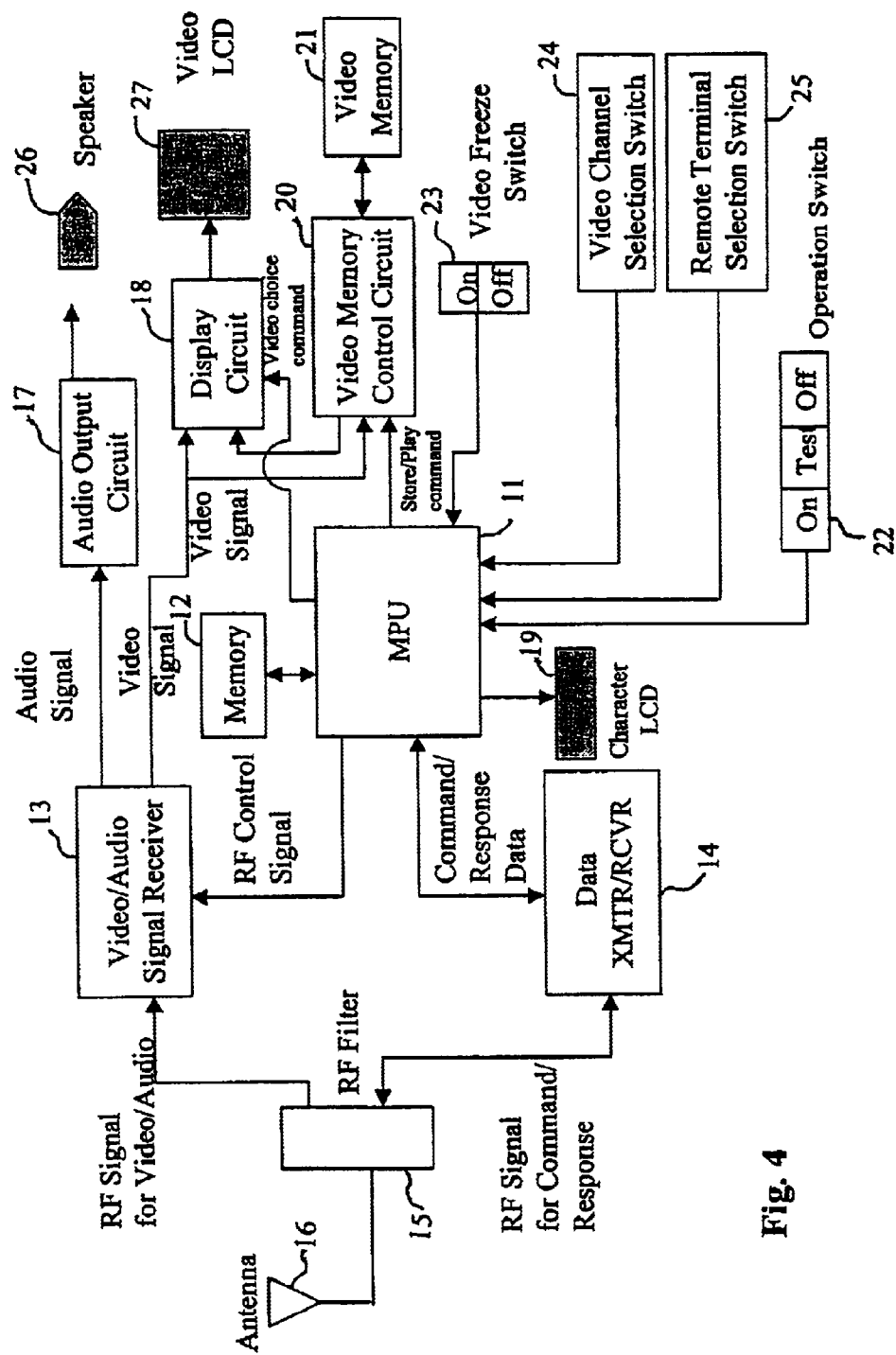
FIG. 4 is a block diagram of the central station in accordance with the present invention.

FIG. 4 is a block diagram of the central station 1 in accordance with the preferred embodiment of the present invention. Referring FIG. 4, the central station 1 comprises a microprocessor unit (MPU) 11, memory 12, video/audio signal receiver 13, data transmission/reception (XMTR/RCVR) circuit 14, radio frequency (RF) filter 15, antenna 16, audio output circuit 17, display circuit 18, character LCD 19, video memory control circuit 20, video memory 21, operation switch 22, video freeze switch 23, channel selection switch 24, remote terminal selection switch 25, speaker 26 and video LCD 27.

In FIG. 4, the MPU 11 is a central processing unit, which is the kernel of the central station 1 for controlling the overall operation of the central station 1 according to a program or instruction set stored in the memory 12. If the channel selection switch 24 selects a transmission/reception channel under the control of an operator, the MPU 11 reads a value corresponding to the selected channel and sends an RF control signal to the video/audio signal receiver 13 on the basis of the read value so that the receiver 13 can operate at a carrier frequency corresponding to the selected channel. When the remote terminal selection switch 25 selects a desired one of the remote terminals 3 under the control of the operator, the MPU 11 reads a value corresponding to the selected remote terminal and specifies the selected remote terminal on the basis of the read value.

Various frequencies, approved by appropriate government agencies, are available for transmission/reception of an audio signal. For example, frequency bands of 900 MHz, 2.4 GHz, 5.8 GHz, etc., are available for transmission/reception of a video signal. The frequency band of 900 MHz has a narrow, allowable bandwidth that it cannot accommodate a large number of video channels, but the higher frequency bands such as 2.4 GHz, 5.8 GHz, etc. have broader bandwidths that they can be partitioned into a large number of video channels. A bandwidth of 4–6 MHz must be assigned to every video channel to obtain a definite and reasonably clear picture. A part of the video frequency bands may be specified and used for audio channels.

In the preferred embodiment of the present invention, the memory 12 stores the program or instruction sets to be executed by the MPU 11. Further, the memory 12 contains variables or constants necessary for the program execution. The video/audio signal receiver module 13 demodulates a video/audio RF signal from a specific one of the remote terminals 3, received through the antenna 16 and RF filter 15, into an audio signal to be outputted through the speaker 26 and a video signal to be displayed on the video LCD 27. At this time, the video/audio signal receiver 13 demodulates the RF signal at a carrier frequency of a channel set by the MPU 11.

The data transmission/reception circuit module 14 is adapted to transmit control command data from the central station 1 to a selected remote terminal and receive response data from the selected remote terminal, corresponding to the transmitted control command data. Namely, the data transmission/reception circuit 14 modulates control command data from the MPU 11 into an RF signal and transmits the modulated RF signal to the specific remote terminal through the RF filter 15 and antenna 16. Further, the data transmission/reception circuit 14 receives a response data RF signal from the specific remote terminal through the antenna 16 and RF filter 15 and demodulates it into response data to be readable by the MPU 11.

The RF filter device 15 is adapted to make a distinction between an RF for data and an RF for video/audio signals and pass signals corresponding to the RFs, respectively. That is, upon receiving an RF signal within the range of the video/audio RF, the RF filter 15 transfers the received RF signal to the video/audio signal receiver 13. In the case where receiving an RF signal within the range of the data RF, the RF filter 15 transfers the received RF signal to the data transmission/reception circuit 14. Further, the RF filter 15 transfers a modulated command data RF signal from the data transmission/reception circuit 14 to the antenna 16 to send out it to a specific remote terminal.

The antenna 16 sends out an RF signal from the central station 1 to a specific remote terminal over a public line or receives an RF signal from the specific remote terminal and transfers it to the RF filter 15. The audio output circuit 17 of the present invention is adapted to receive an audio signal from the video/audio signal receiver 13 and output it to the speaker 26.

The display circuit 18 chooses a video signal from the video/audio signal receiver 13 or a video signal from the video memory control circuit 20 and transfers the chosen video signal to the video LCD 27. This choice is controlled by a video choice command from the MPU 11.

The character LCD 19 is an output device for providing a character or numeric indication of the state or operated results of the system to the user during the system operation. Namely, the character LCD 19 displays an initialized state, a channel number in operation, a remote terminal number, and good and not-good states of power on, power off and test mode results. The character LCD 19 may be combined with the video LCD 27 to display image and data thereon.

When the user activates the video freeze switch 23 to view a still image of one shot while viewing a moving image on the video LCD 27, the video memory control circuit 20 is operated in response to a video capture command from the MPU 11 to capture a video signal from the video/audio signal receiver 13 in an instant. The video memory control circuit 20 stores the captured video signal in the video memory 21 and transfers the stored video signal to the display circuit 18. As a result, the still image of, for example, one shot or frame is displayed on the video LCD 27. Thereafter, when the user turns off the video freeze switch 23, the MPU 11 controls the display circuit 18 to display a moving image on the video LCD 27. The video memory 21 is adapted to store a still video signal in the manner described above.

The operation switch 22 is used when the central station 1 operates a desired remote terminal 3. The operation switch 22 includes a test button for applying a test command to the MPU 11 to check a data communication state with the desired remote terminal, an on button for applying a control command to the MPU 11 to control the desired remote terminal in order for it to transmit video/audio signals, and an off button for applying a control command to the MPU 11 to control the desired remote terminal in order for it to discontinue the video/audio signal transmission and enter a standby state.

The video freeze switch 23 applies a control command to the MPU 11 to control the video memory control circuit 20 in order for it to capture a still image of, for example, one frame while the user monitors a moving image on the video LCD 21. At the moment that the video freeze switch 23 is activated, the video memory control circuit 20 captures a video signal from the video/audio signal receiver 13 as a still image and outputs the captured still image to the video LCD 27. Thereafter, when the video freeze switch 23 is deactivated, the video LCD 27 returns to a moving image.

The channel selection switch 24 is adapted to select a desired one of a plurality of video/audio transmission/reception frequency bands set among the central station 1 and remote terminals 3. The MPU 11 reads a channel number selected by the channel selection switch 24 and sends the read channel number to the video/audio signal receiver 13 in order for it to generate an RF carrier corresponding to the selected channel number.

The remote terminal selection switch 25 is used when the central station 1 selects a desired one of the remote terminals 3. The MPU 11 activates a remote terminal corresponding to a remote terminal ID selected by the remote terminal selection switch 25.

Figure 5:
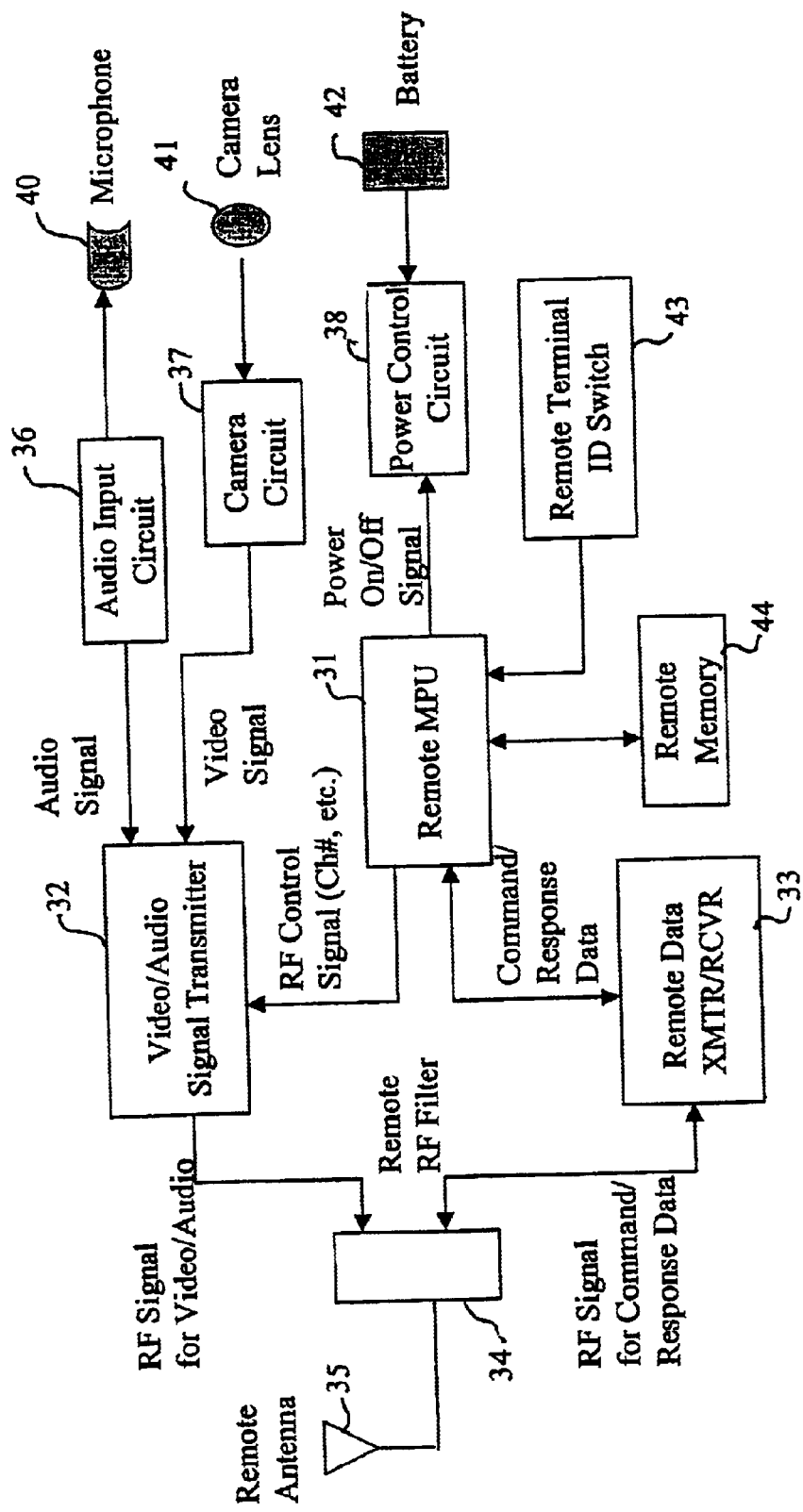
FIG. 5 is a block diagram of the remote terminal in accordance with the present invention.

FIG. 5 is a block diagram of each of the remote terminals 3 in accordance with the present invention. Referring to FIG. 5, each remote terminal comprises an MPU 31, memory 44, video/audio signal transmitter 32, data transmission/reception (XMTR/RCVR) circuit 33, RF filter 34, antenna 35, audio input circuit 36, microphone 40, camera circuit 37, camera lens 41, power control circuit 38 and battery 42. Each remote terminal further comprises a remote terminal ID switch 43 for allowing the central station 1 to identify the associated remote terminal.

In FIG. 5, the remote MPU 31 is a central processing unit, which is the kernel of the remote terminal 3 for controlling the overall operation of the remote terminal 3 according to a program stored in the memory 44. A command data RF signal sent from the central station 1 is received and demodulated by the remote data transmission/reception circuit 33 into control command data, which is then supplied to the MPU 31. The MPU 31 fetches a control command from the control command data, sends response data corresponding to the fetched control command to the central station 1 and performs a function corresponding to the fetched control command.

The remote video/audio signal transmitter module 32 mixes a video signal from the camera circuit 37 with an audio signal from the microphone 40, modulates the mixed signal into an RF signal and transmits the modulated RF signal to the central station 1 through the RF filter 34 and antenna 35. At this time, the MPU 31 fetches a channel number from control command data sent from the central station 1, and the video/audio signal transmitter 32 performs the modulation at a frequency corresponding to the channel number fetched by the MPU 31.

The remote data transmission/reception circuit module 33 is adapted to receive control command data from the central station 1 and transmit response data from the associated remote terminal, corresponding to the received control command data, to the central station 1. Namely, the data transmission/reception circuit 33 demodulates an RF signal from the central station 1, received through the antenna 35 and remote RF filter 34, into control command data and transfers the demodulated control command data to the MPU 31. Further, the data transmission/reception circuit 33 modulates response data from the MPU 31 into an RF signal and transmits the modulated RF signal to the central station 1 through the remote RF filter 34 and antenna 35.

The remote RF filter device 34 is adapted to make a distinction between an RF for data and an RF for video/audio signals and pass signals corresponding to the RFs, respectively. As a result, the RF filter device 34 selectively sends out the video/audio RF signal from the video/audio signal transmitter 32 within the range of the video/audio RF and the response data RF signal from the data transmission/reception circuit 33 within the range of the data RF to the central station 1 through the remote antenna 35. Further, the RF filter 34 transfers a modulated command data RF signal from the central station 1 to the data transmission/reception circuit 33.

The antenna 35 for the remote terminal 3 sends out an RF signal from the associated remote terminal to the central station 1 over the public line or receives an RF signal from the central station 1 and transfers it to the RF filter 34. The audio input circuit 36 acts to transfer an audio signal from the microphone 40 to the video/audio signal transmitter 32. The camera circuit 37 is adapted to convert an image incident on the camera lens 41 into a video signal and transfer the converted video signal to the video/audio signal transmitter 32.

In the preferred embodiment, the power control circuit 38 is adapted to minimize power consumption of the battery 42 in the associated remote terminal. The power control circuit 38 supplies power to the video/audio signal transmitter 32, audio input circuit 36 and camera circuit 37 only when video and audio signals are transmitted to the central station 1 while the associated remote terminal is operated in a power saving mode under the control of the remote MPU 31.

Remote terminal IDs are unique numbers or letters that the central station 1 assigns to one or more remote terminals 3 to identify them. In each of the remote terminals 3, the remote terminal ID switch 43 sets a unique ID and applies it to the MPU 31. As a result, the MPU 31 compares the ID from the remote terminal ID switch 43 with that contained in control command data sent from the central station 1 to determine whether the associated remote terminal is called by the central station 1. In the present embodiment, a remote terminal ID is assigned with five bits, or bits 3–7 in control command data, resulting in the creation of 32 codes.

FIG. 6 shows a bit format of an operation code for control command data that the central station 1 sends to each of the remote terminals 3 and for response data that each of the remote terminals 3 sends to the central station 1, in accordance with the present invention. In the present embodiment, the operation code is of two bytes (bits 0–15), which are mapped as in the below table 1. The operation code employs only the first one byte (bits 0–7) in the case where it is used as a response code.

TABLE 1

| BITS | VALUES | FUNCTIONS |
|------|--------|-----------|
| 0 | 1 | COMMAND |
| 0 | 0 | RESPONSE |
| 1–2 | 0 | TEST |
| 1–2 | 1 | POWER ON |
| 1–2 | 2 | POWER OFF |
| 1–2 | 3 | RESERVED |
| 3–7 | 0–31 | CALLED REMOTE TERMINAL ID |
| 8–11 | 0–15 | RF CHANNEL NUMBER |
| 12–15 | — | RESERVED |

In the above table 1, the bit 0 indicates that the operation code is a command code, if its value is 1, and that the operation code is a response code, if its value is 0.

The bits 1–2 indicate a test command if their mask value is 0, a power on command if their mask value is 1 and a power off command if their mask value is 2.

The bits 3–7 have any one of mask values 0–31 to represent any one of 32 remote terminal IDs.

The bits 8–11 have any one of mask values 0–15 to represent any one of 16 channel frequencies, which is determined according to the associated program.

Figure 7:
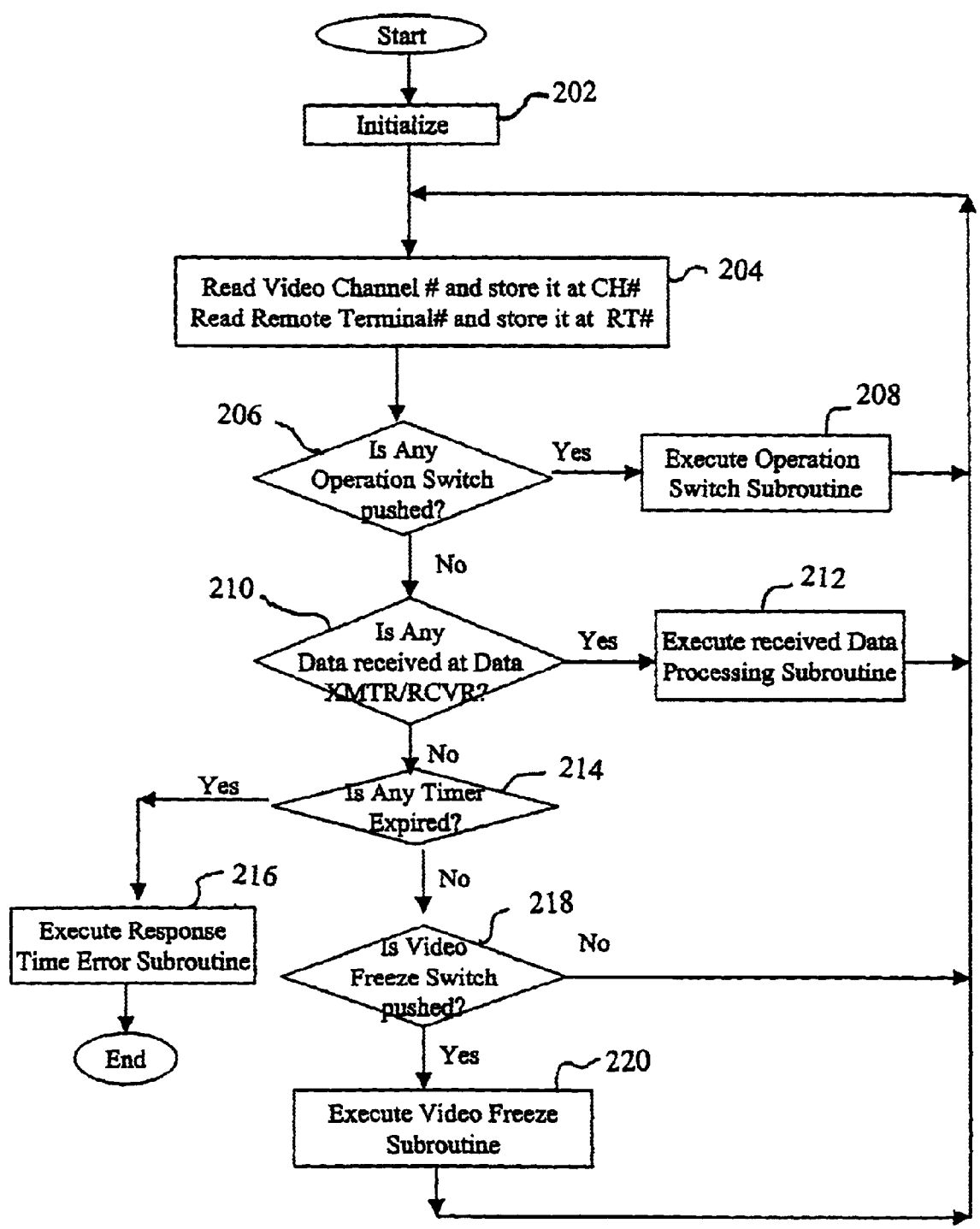
FIG. 7 is a flowchart illustrating the operation of the central station in accordance with the present invention.

FIG. 7 is a flowchart illustrating the operation of the central station 1 in accordance with the present invention. First, when the central station 1 is activated, the MPU 11 reads in step 202 the program from the memory 12 and initializes the central station 1 according to the read program. Then, at a variable update loop, the MPU 11 reads a channel number selected by the channel selection switch 24 and updates a data variable CH to the read channel number in step 204. Further, in step 204, the MPU 11 reads a remote terminal ID selected by the remote terminal selection switch 25 and updates a data variable RT to the read remote terminal ID.

Subsequently, if the operation switch 22 is enabled which is verified at step 206, the MPU 11 executes an operation switch subroutine in step 208 and then returns to the variable update loop. If the operation switch 22 is disabled, the MPU 11 determines in step 210 whether there is any data received at the data transmission/reception circuit 14. If there is any data received at the data transmission/reception circuit 14, the MPU 11 executes a received data processing subroutine in step 212 and then returns to the variable update loop. If there is no data received at the data transmission/reception circuit 14, the MPU 11 determines whether response data is received within a predetermined response time in step 214. In step 216, if no response data is received within the predetermined response time, the MPU 11 sends a response execution error message to the character LCD 19 and then ends the entire operation. However, in the case where the response data is received within the predetermined response time in step 218, the MPU 11 determines whether the video freeze switch 23 is enabled. If the video freeze switch 23 is activated, the MPU 11 executes a video freeze subroutine in step 220 and then returns to the variable update loop. If the video freeze switch 23 is inactivated, the MPU 11 returns directly to the variable update loop.

Figure 8:
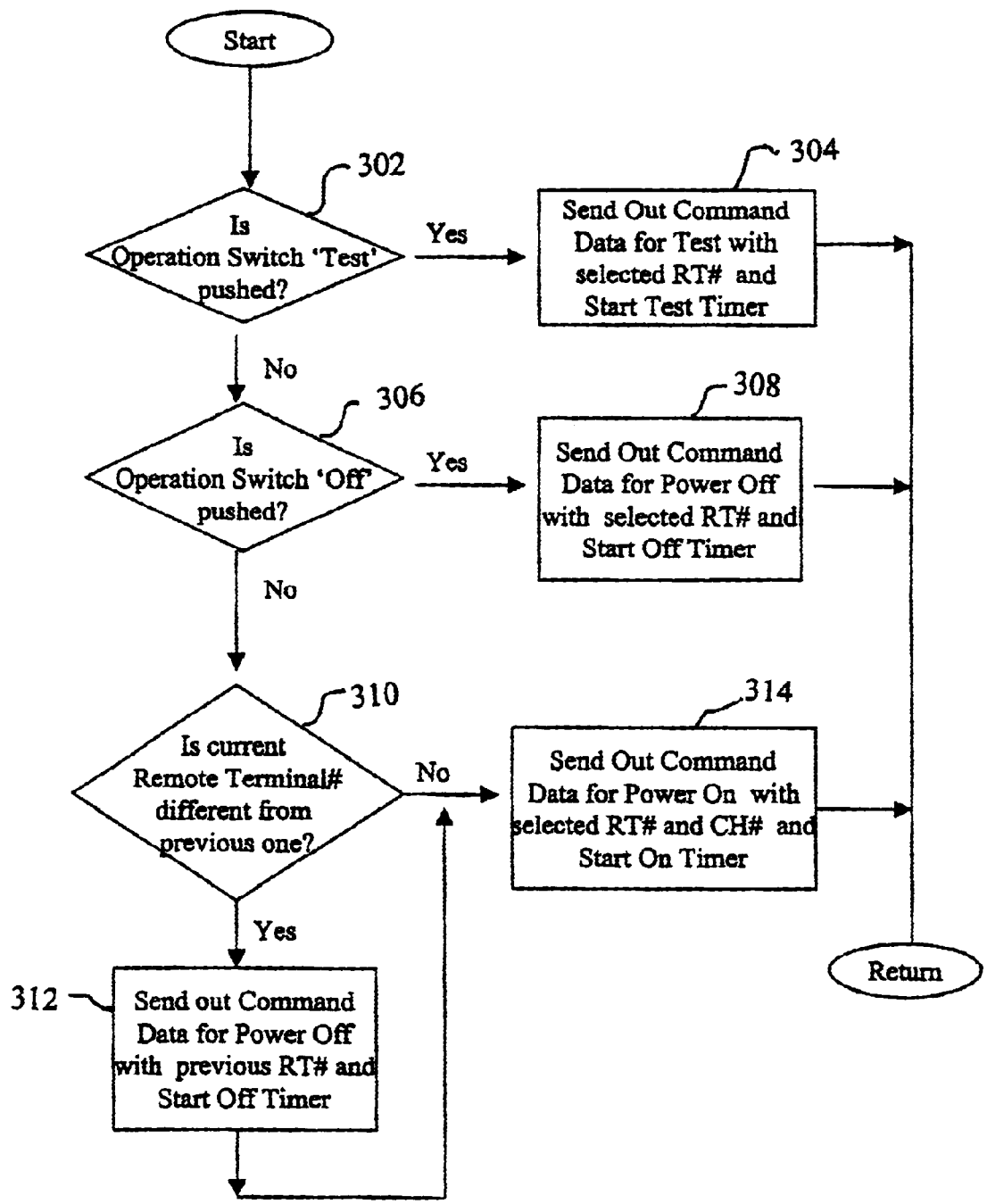
FIG. 8 is a flowchart illustrating an operation switch subroutine shown in FIG. 7.

FIG. 8 is a flowchart illustrating the operation switch subroutine in FIG. 7. First, if the operation switch 22 is determined to be set to a test mode in step 302, the MPU 11 sends out test command data in step 304 with the remote terminal ID selected by the remote terminal selection switch 25 to a current remote terminal corresponding to the selected remote terminal ID. Further, the MPU 11 starts a test timer and then returns to the variable update loop. If the operation switch 22 is not set to the test mode, the MPU 11 determines whether the operation switch 22 is set to a power off mode in step 306. If the operation switch 22 is set to the power off mode, the MPU 11 sends out power off command data in step 308 with the selected remote terminal ID to the current remote terminal. Further, the MPU 11 starts an off timer and then returns to the variable update loop. Unless the operation switch 22 is not set to the power off mode, the MPU 11 determines whether the selected remote terminal ID is different from a previous one in step 310.

In the case where the selected remote terminal ID is different from the previous one, the MPU 11 sends out power off command data in step 312 with the previous remote terminal ID to a previous remote terminal to change the previous remote terminal to a standby state and then starts the off timer. Thereafter or unless the selected remote terminal ID is different from the previous one, the MPU sends out power on command data in step 314 with the selected remote terminal ID and channel number to the current remote terminal, starts an on timer and then returns to the variable update loop.

Figure 9:
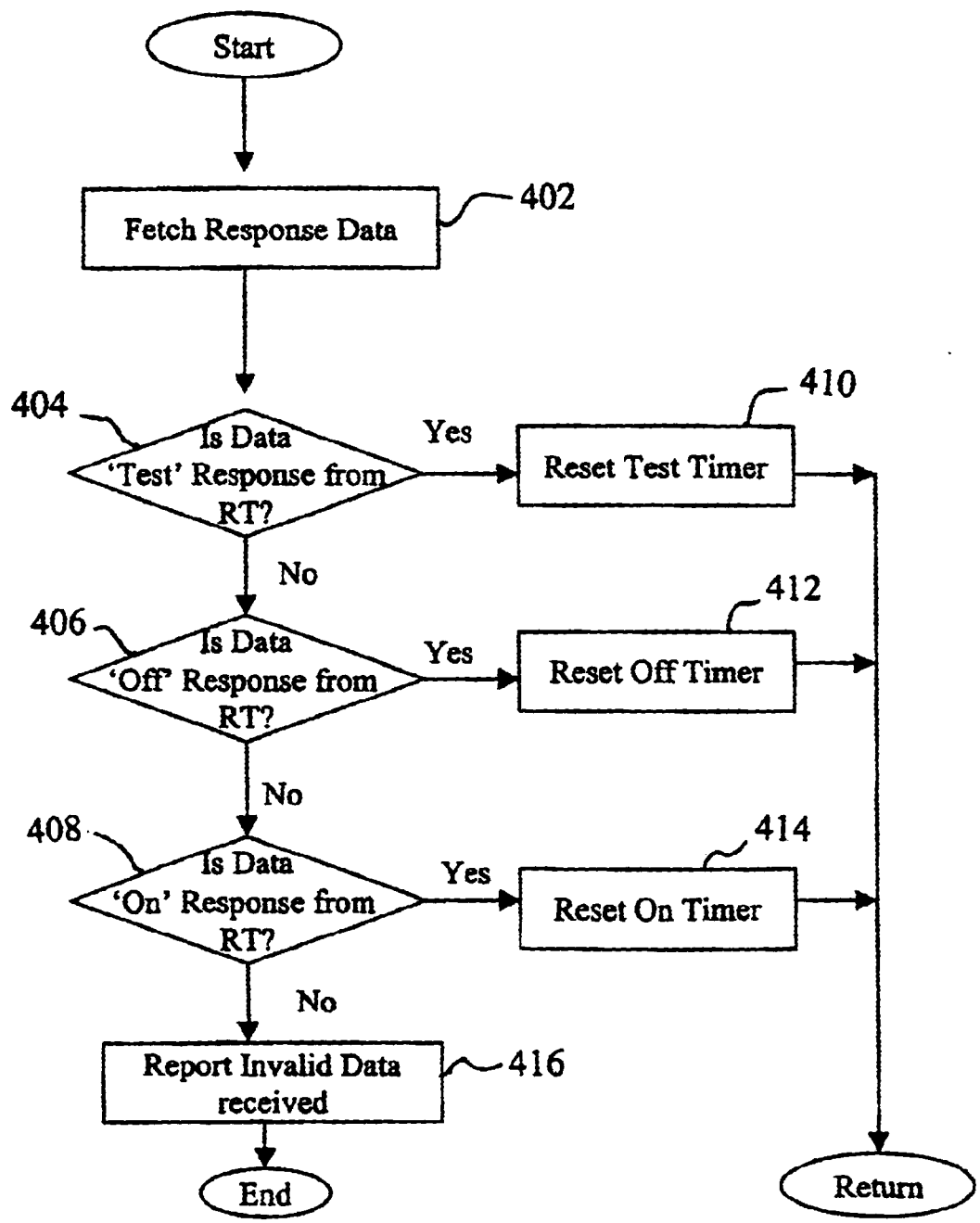
FIG. 9 is a flowchart illustrating a received data processing subroutine shown in FIG. 7.

FIG. 9 is a flowchart illustrating the received data processing subroutine in FIG. 7. First, the MPU 11 fetches a control command in step 402 from the response data from the data transmission/reception circuit 14 and determines whether the fetched control command is a test command, off command or on command in steps 404, 406 and 408, respectively. The MPU 11 resets the test timer in step 410 if the fetched control command is the test command, the off timer in step 412 if the fetched control command is the off command and the on timer in step 414 if the fetched control command is the on command, and then returns to the variable update loop. However, in the case where the fetched control command is not set to any one of the test command, off command and on command, the MPU 11 sends a response data error message in step 416 to the character LCD 19 and then ends the entire operation.

Figure 10:
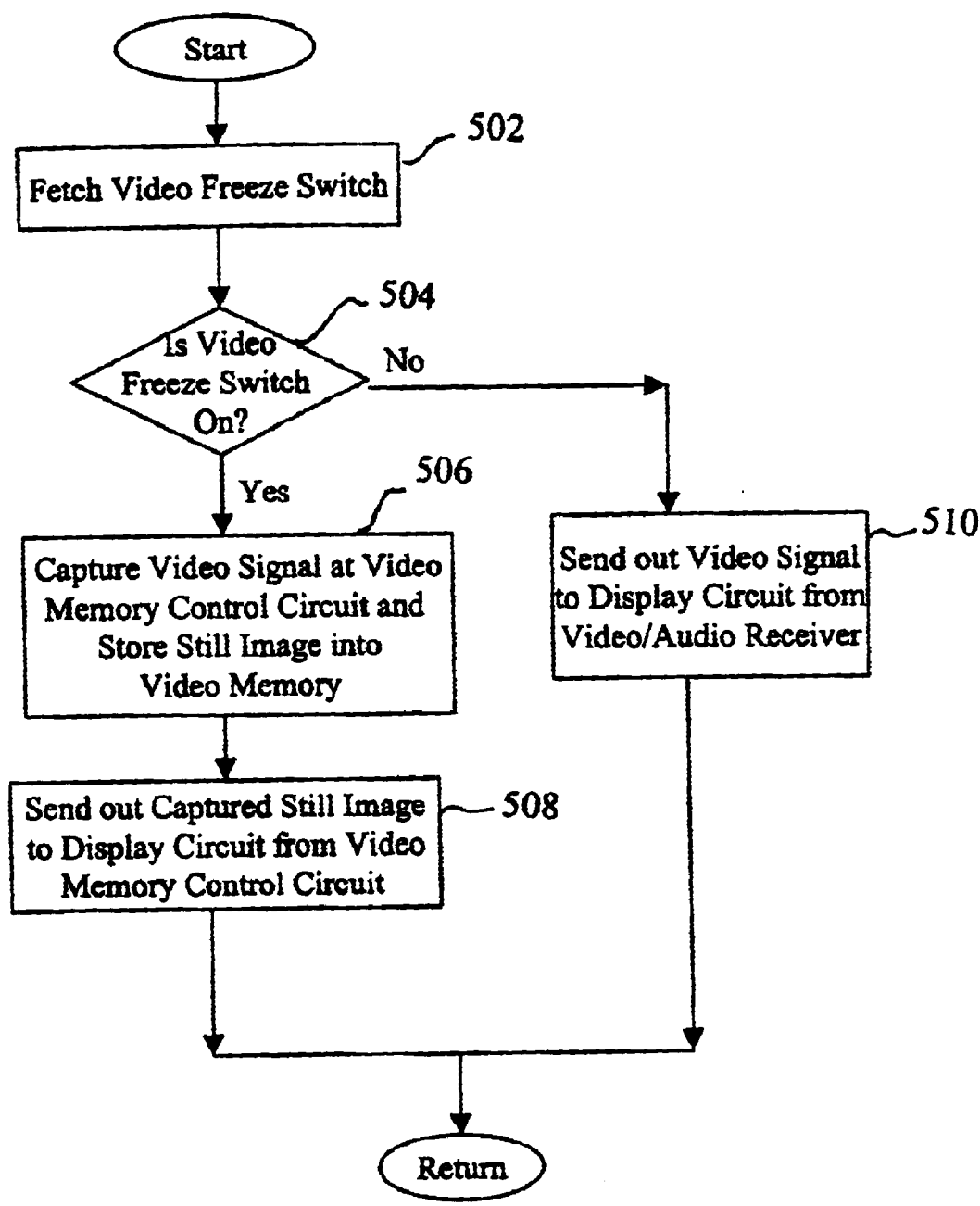
FIG. 10 is a flowchart illustrating a video freeze subroutine shown in FIG. 7.

FIG. 10 is a flowchart illustrating the video freeze subroutine shown in FIG. 7. First, the MPU 11 fetches the status of the video freeze switch 23 in step 502. If the video freeze switch 23 is activated as determined in step 504, the MPU 11 controls the video memory control circuit 20 to capture a video signal from the video/audio signal receiver 13 as a still image and store the captured still image in the video memory 21 in step 506. Then, in step 508, the video memory control circuit 20 transfers the still image stored in the video memory 21 to the display circuit 18 to reproduce it on the video LCD 27. However, if the video freeze switch 23 is not activated, the MPU 11 controls the display circuit 18 to transfer a moving video signal from the video/audio signal receiver 13 to the video LCD 27 in step 510. As a result, a moving image sent from a remote terminal is reproduced on the video LCD 27. Then, the MPU 11 returns to the variable update loop.

Figure 11:
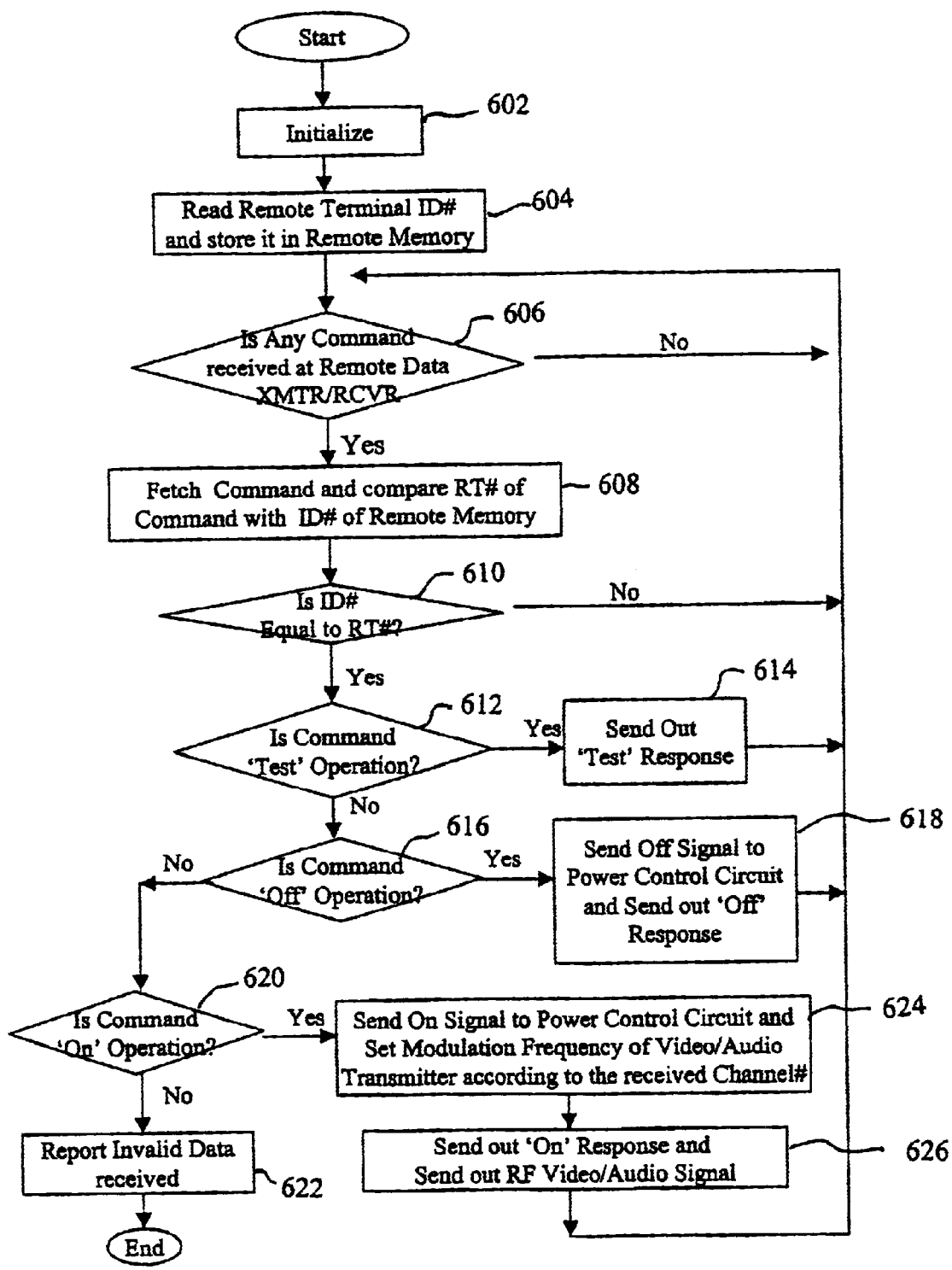
FIG. 11 is a flowchart illustrating the operation of the remote terminal in accordance with the present invention.

FIG. 11 is a flowchart illustrating the operation of each one of the remote terminals 3 in accordance with the present invention. First, each remote terminal is initialized in step 602. In step 604, the MPU 31 reads a self remote terminal ID from the remote terminal ID switch 43 and stores it in the memory 44. Then, in step 608 at a data detection loop, the MPU 31 determines whether there is any command received at the data transmission/reception circuit 33. If there is any command received at the data transmission/reception circuit 33, the MPU 31 fetches a remote terminal ID from the received command and compares it with that stored in the memory 44 in step 608. If the remote terminal IDs are different from each other as processed in step 610, the MPU 31 returns to the data detection loop.

In the case where the remote terminal IDs are equal to each other, the MPU 31 determines whether the received command is a test command in step 612. If the received command is the test command, the MPU 31 sends out test response data to the central station 1 and then returns to the data detection loop in step 614.

If the received command is not the test command, the MPU 31 determines whether the received command is an off command in step 616. If the received command is the off command, the MPU 31 sends an off control signal in step 618 to the power control circuit 38, sends out off response data to the central station 1 and then returns to the data detection loop. If the received command is not the off command, the MPU 31 determines whether the received command is an on command in step 620. If the received command is not the on command, the MPU 31 recognizes that the received command is invalid in step 622, and then ends the entire operation. However, in the case where the received command is the on command, the MPU 31 sends an on control signal to the power control circuit 38 and sets a video/audio transmission frequency to that fetched from the received command. Subsequently, the MPU 31 sends out on response data and a video/audio RF signal to the central station 1 and then returns to the data detection loop. As a result, the associated remote terminal transmits video and audio signals to the central station 1 until it receives the off command from the central station 1.

As apparent from the above description, the present invention provides a remotely operated wireless video/audio hand-held monitoring system in which one portable central station selectively controls one or more remote terminals to monitor images and voices at remote locations by wireless. Further, wireless data communication and analog communication are performed together so that the remote terminals can efficiently be controlled and images and voices at remote locations can be monitored. Moreover, the portable remote terminals can easily be installed at low cost to monitor objects that frequently shift their positions, and the portable central station can monitor the objects at its various positions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A wireless communication system for transmitting and receiving video and audio signals, the communication system comprising:

a central station having a display and a speaker, the central station sending out control command data containing a remote terminal identifier, a communication frequency channel number and any one of a test command, a power on command and a power off command, receiving response data corresponding to the control command data and reproducing video and audio signals transmitted at a frequency corresponding to the communication frequency channel number, respectively, through the display and speaker in response to the received response data; and at least one remote terminal having a camera and a microphone, the remote terminal receiving the control command data from the central station, sending out the response data corresponding to the received control command data to the central station and, in a power on mode based on the power on command, driving the camera, the microphone and a video/audio signal transmitter and transmitting a video signal from the camera and an audio signal from the microphone to the central station at the frequency corresponding to the communication frequency channel number.

2. The wireless communication system of claim 1, wherein the central station comprises:

a first microprocessor unit for controlling the entire operation of the central station and generating the control command data;

a first memory for storing a program to be executed by the first microprocessor unit and variables or constants necessary to the program execution;

a video/audio signal receiver for demodulating a video/audio radio frequency signal from the remote terminal into an audio signal and a video signal;

a first data transmission/reception circuit for modulating the control command data from the first microprocessor unit into a command data radio frequency signal, demodulating a response data radio frequency signal from the remote terminal into the response data and transferring the demodulated response data to the first microprocessor;

a first radio frequency filter for transferring the command data radio frequency signal from the first data transmission/reception circuit to a first antenna and passing the video/audio radio frequency signal and response data radio frequency signal from the remote terminal respectively to the video/audio signal receiver and first data transmission/reception circuit;

the first antenna sending out the command data radio frequency signal from the first radio frequency filter to the remote terminal over a public line, receiving the video/audio radio frequency signal and response data radio frequency signal from the remote terminal and transferring them to the first radio frequency filter;

an audio output circuit for receiving the audio signal from the video/audio signal receiver and outputting it to the speaker;

a display circuit for choosing the video signal from the video/audio signal receiver or a still video signal in response to a video choice command from the first microprocessor and outputting the selected video signal to the display;

a video freeze switch for instructing the first microprocessor unit to generate a video capture command;

a video memory control circuit responsive to the video capture command from the first microprocessor unit, for capturing the video signal from the video/audio signal receiver in an instant, storing the captured video signal in a video memory and transferring the stored video signal as the still video signal to the display circuit;

an operation switch for instructing the first microprocessor unit to generate any one of the test command, power on command and power off command;

a channel selection switch for selecting the communication frequency channel number; and a remote terminal selection switch for selecting a desired one of a plurality of remote terminals;

wherein the at least one remote terminal comprises:

a second microprocessor unit for controlling the overall operation of the remote terminal according to a program stored in a second memory and in response to the control command data from the central station, the second microprocessor unit generating the response data corresponding to the control command data from the central station;

the video/audio signal transmitter mixing the video signal from the camera with the audio signal from the microphone and modulating the mixed signal into the video/audio radio frequency signal at the frequency corresponding to the communication frequency channel number;

a second data transmission/reception circuit for demodulating the command data radio frequency signal from the central station into the control command data, transferring the demodulated control command data to the second microprocessor unit and modulating the response data from the second microprocessor unit into the response data radio frequency signal;

a second radio frequency filter for transferring the command data radio frequency signal from the central station to the second data transmission/reception circuit and selectively passing the video/audio radio frequency signal from the video/audio signal transmitter and the response data radio frequency signal from the second data transmission/reception circuit;

a second antenna for sending out the video/audio radio frequency signal and response data radio frequency signal from the second radio frequency filter to the central station over the public line, receiving the command data radio frequency signal from the central station and transferring it the second radio frequency filter;

an audio input circuit for transferring the audio signal from the microphone to the video/audio signal transmitter;

a camera circuit for converting an image incident on a camera lens into a video signal and transferring the converted video signal to the video/audio signal transmitter;

a power control circuit for supplying power to the video/audio signal transmitter, audio input circuit and camera circuit only for video/audio signal transmission in a power saving mode under the control of the second microprocessor unit to minimize power consumption of the remote terminal; and a remote terminal identifier switch for transferring the remote terminal identifier contained in the control command data from the central station to the second microprocessor unit.

3. A method of transmitting/receiving video and audio signals using a portable wireless communication system, the method comprising the steps of:

(a) allowing a central station with a display and a speaker to send out control command data containing a remote terminal identifier, a communication frequency channel number and any one of a test command, a power on command and a power off command, to receive response data corresponding to the control command data and to reproduce video and audio signals transmitted at a frequency corresponding to the communication frequency channel number, respectively, through the display and speaker in response to the received response data; and (b) allowing at least one remote terminal with a camera and a microphone to receive the control command data from the central station, to send out the response data corresponding to the received control command data to the central station and to, in a power on mode based on the power on command, drive the camera, the microphone and a video/audio signal transmitter and transmit a video signal from the camera and an audio signal from the microphone to the central station at the frequency corresponding to the communication frequency channel number.

* * * * *